Aug. 7, 1934.  E. R. PERSON  1,969,323
SHAPING MACHINE
Filed June 16, 1930  3 Sheets-Sheet 1
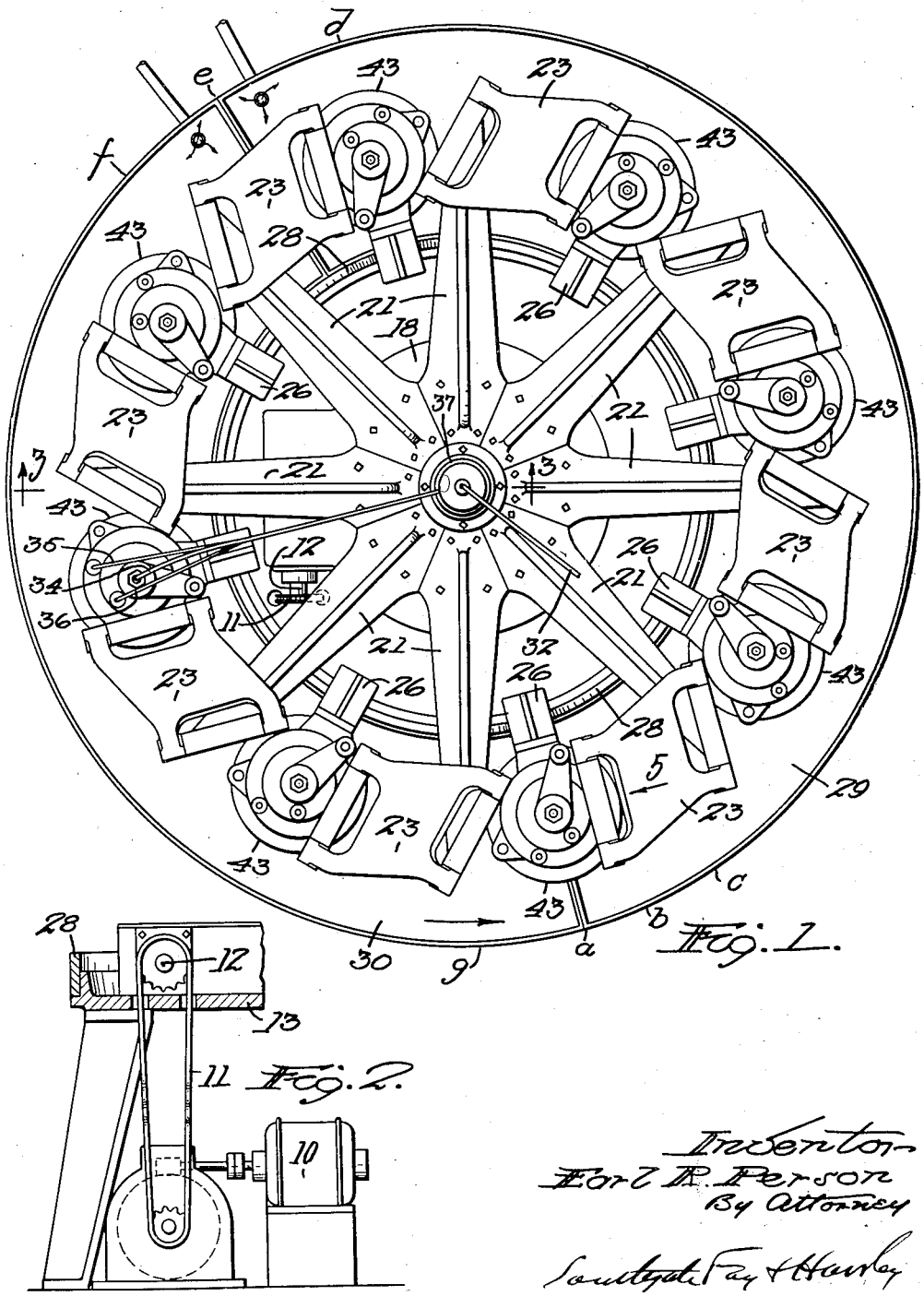

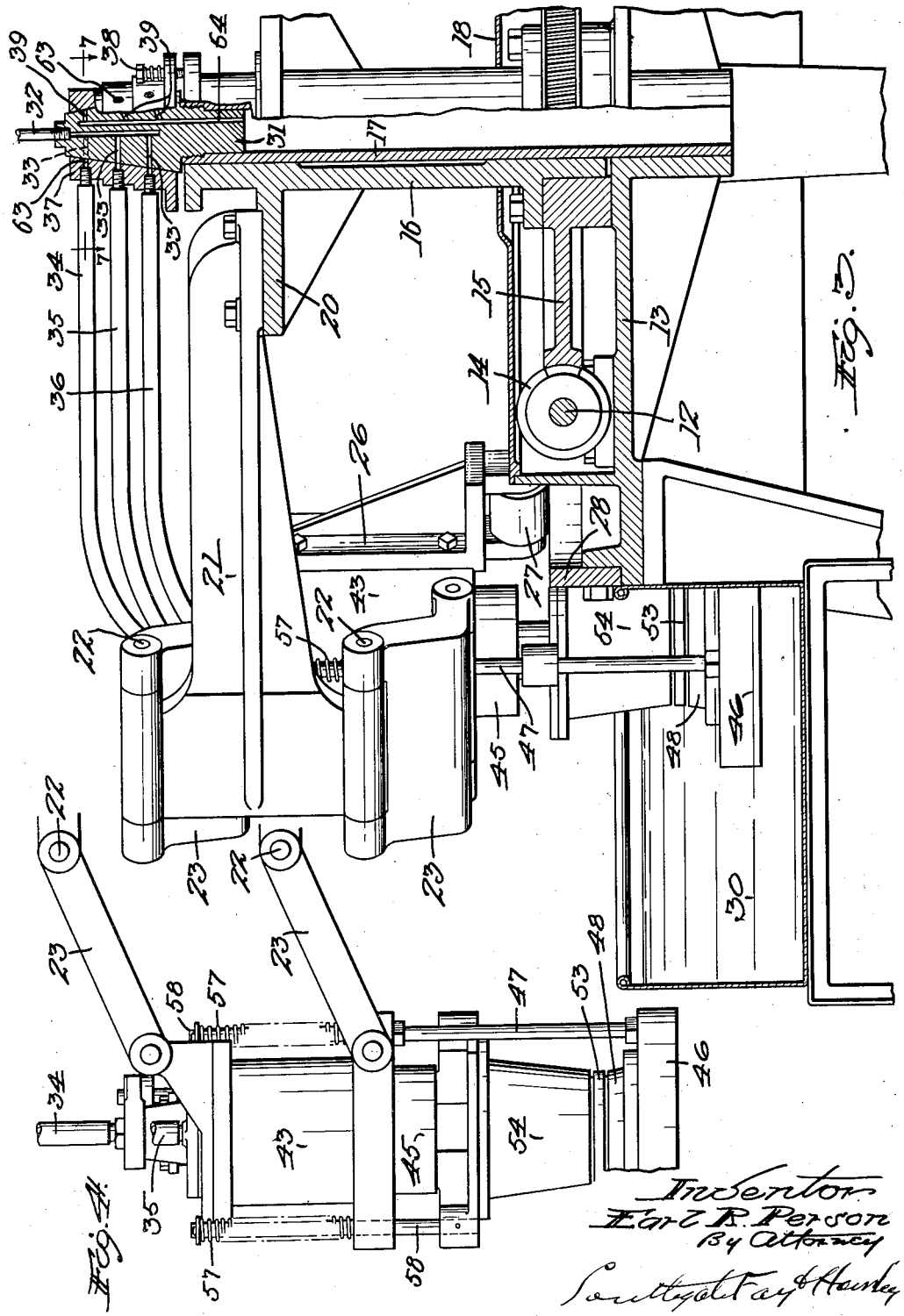

Aug. 7, 1934.  E. R. PERSON  1,969,323
SHAPING MACHINE
Filed June 16, 1930  3 Sheets-Sheet 3
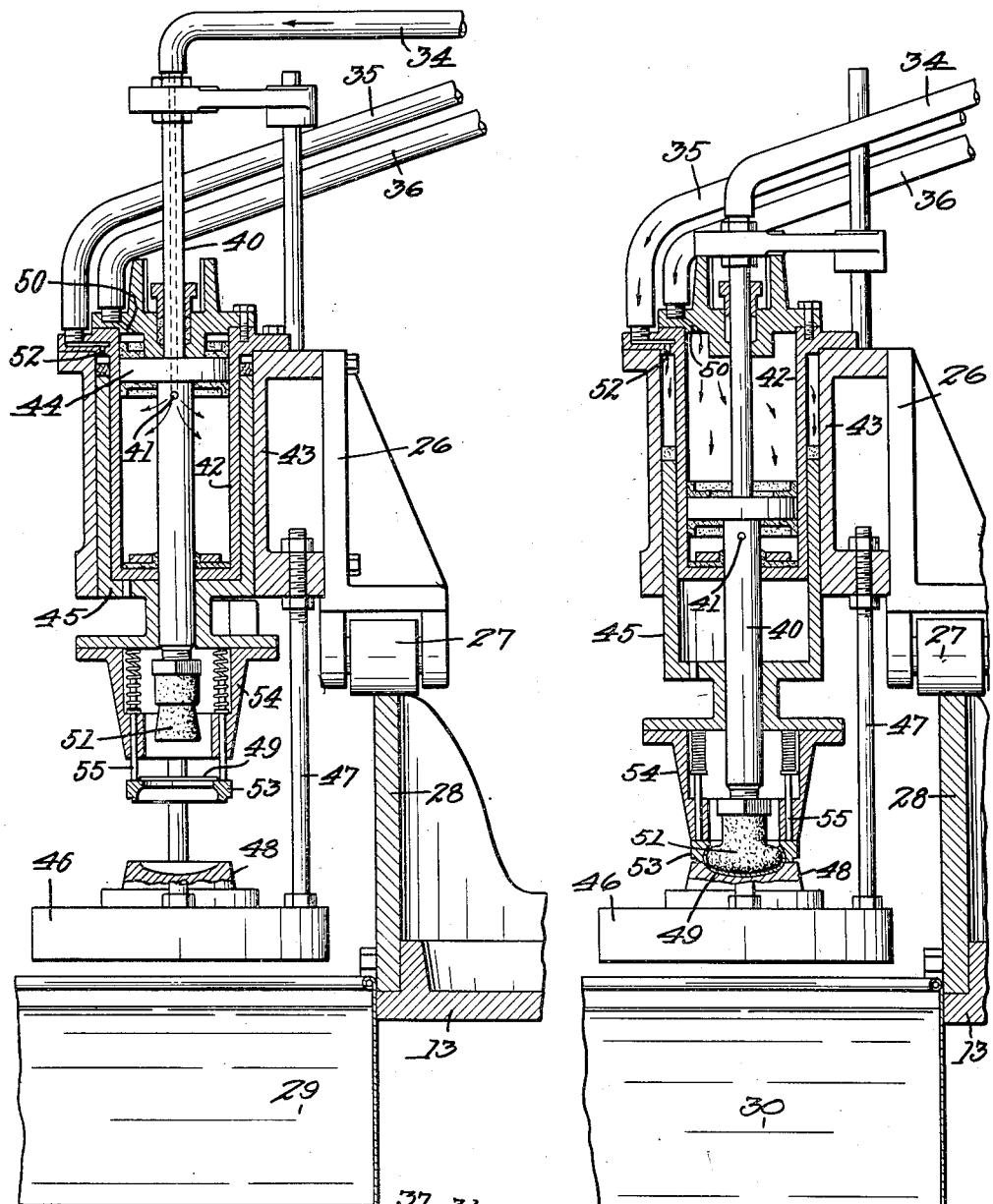
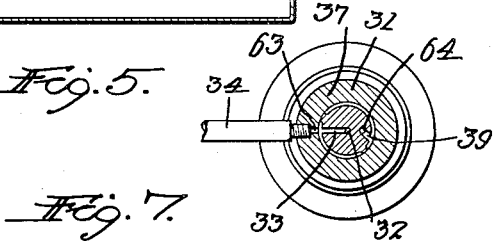

Patented Aug. 7, 1934

1,969,323

UNITED STATES PATENT OFFICE 1,969,323

SHAPING MACHINE

Earl R. Person, Leominster, Mass., assignor to Du Pont Viscoloid Company, Wilmington, Del., a corporation of Delaware Application June 16, 1930, Serial No. 461,298

8 Claims. (Cl. 18—20)

This invention relates to a multiple machine for molding plastic substances, such as viscoloid, rubber, bakelite, and various other materials.

The principal objects of the invention are to provide a machine in which a number of objects, either duplicates or otherwise, can be carried around at the same time and the molding operations be performed successively upon each, so that the output of the machine will be very large; to provide means, in conjunction therewith and controlled by the rotation of the machine, for lowering the dies into hot water for the purpose of softening the plastic material at the beginning of the operation, and then immersing them in cold water to harden them again after the molding operation is finished and before the discharge of the articles from the molds; to provide a simple form of valve mechanism all operated by the rotation of the machine for controlling the operation of the various dies and other parts that go to make up the mold; and to provide improvements in the construction and operation of the means for raising and lowering the mold itself for immersion purposes and manipulating the several die parts.

Other objects and advantages of the invention will appear hereinafter.

Reference is to be had to the accompanying drawings, in which

Fig. 1 is a plan of the rotary machine constructed in accordance with this invention;

Fig. 2 is a radial sectional view showing the drive;

Fig. 3 is a radial sectional view on the line 3—3 of Fig. 1 on enlarged scale;

Fig. 4 is a side elevation of one of the molding devices and its supporting and operating elements;

Fig. 5 is a radial sectional view of a molding device showing it with all parts elevated and out of action;

Fig. 6 is a similar view showing the parts depressed and in the act of molding the plastic blank into its desired form; and Fig. 7 is a sectional view on the line 7—7 of Fig. 3.

Although the invention can be carried out in reciprocating or oscillating form, it is shown as applied to a rotary machine in the form of a horizontal table provided with a framework rotatable on a vertical axis and adapted to mold articles continuously. The power is shown as supplied through a motor 10 and drive mechanism 11 to a tangential shaft 12. This shaft is mounted in bearings on a stationary horizontal table 13. It is provided with a worm 14 operating a worm wheel 15, the hub of which is provided with a vertical standard 16 and rotatable about a hollow stationary shaft 17 located at the center of the table. These parts are all covered by a plate 18 to protect them from dirt and dust in the factory and particularly to reduce the fire risk from particles of pyroxylin or the like.

On the top of the sleeve 16 is a platform 20. This supports a plurality of radiating arms 21. Each of these arms constitutes a support for one of the molding devices, of which this machine is made up, and each one is provided with two pivot studs 22 located at top and bottom on which arms 23 are mounted to swing. At the ends these arms 23 carry the mold frame and die and, being pivoted to the top and bottom thereof as indicated in Fig. 4, they provide a parallel motion so that the molding devices can move up and down vertically. The links 23 of course have their pivot studs arranged at the same distance from each other along parallel lines, so that it constitutes a parallel motion and the mold frame will always be held in vertical position as the pivot studs are vertically above and below each other.

It may be stated at this point that this mold frame as a whole supports the dies and mold parts and also the mechanism for opening and closing the dies. Each one of these mold frames is provided with a bracket 26 on the bottom of which is a roll 27. All these rolls run on a stationary cam track 28 which is mounted on the table 13 at the circumference thereof and gives an up and down motion to the several rolls 27. This track supports these mold frames in this way and results in raising and lowering the same as the several elements of the machine rotate around the center. The purpose of this is to immerse the molds in a tank 29 containing hot water or other heated fluid for the purpose of softening the plastic material before the pressure of the mold is applied to it, taking it up out of that tank and again immersing it in a tank 30 of cold water to chill and set the plastic object after it has been molded and before it is discharged from the mold.

At the top of the central shaft 17 and fixed thereto is a multiple valve 31. This valve is provided with a single inlet 32 for compressed air or other fluid under pressure. This is provided with a central passage from which radiate side passages 33, which are elongated at their ends to allow the pressure to be applied as long as necessary and each of these side passages is connected by a flexible pipe, as 34, 35 and 36 with the mold frame as will appear. The valve 31 of the valve is stationary while the casing 37, being fixed to the hollow standard 16, rotates with it. The casing 37 is secured to a flange on the top of the sleeve 16 by two or more screws 38, so that it is assured that this casing 37 shall rotate with the wheel made up of the platform 20 and radiating arms 21. Consequently the various ports 63 in the casing are opened and closed as they rotate past the ports 33 in the stationary valve 31. There are as many of these lateral ports 63 of each group as there are arms 21, and consequently, molding frames. The number of these pipes and ports is dependent upon the number of operations performed by the mold in the closing and opening, and in this case three are shown for each mold frame. The exhaust is through the same pipes 34, 35 or 36, ports 63, lateral ports 39, and outlet passage 64 in the valve.

Referring now particularly to Figs. 5 and 6, it will be seen that in Fig. 5, the compressed air has been admitted through the pipe 34 and a perforation through a piston rod 40 and out through a port 41 into the interior of the stationary cylinder 42 below a piston 44 therein. By "stationary" I mean that it is stationary as to the mold frame 43, although the mold frame itself moves up and down. The result of this has been to force up the piston 44 on the piston rod 40 until it reaches the top of its possible travel, as shown in this figure. This raises the piston rod 40 to its highest position. Furthermore a hollow piston 45 has also been raised to its highest position by this time by springs 57 on rods 58 carried by the base of the piston 45. The springs bear on washers carried at the tops of the rods 58 and at the bottom bear on a bottom flange on the mold frame 43, through which the rods 58 are free to slide.

Now with the parts in this position, the base 46 of the mold frame, which is supported from the frame 43 by rods 47, carries a die 48 above which is a die member 53. On the die 53 is placed a blank 49 of plastic pyroxylin or other soft material. When the blank 49 is placed on top of 53, the member 54 descends until 54, 53, and 48 are together, forming the complete mold at which time blank 49 is slightly clamped at the outer edge. All these dies are loaded at the same point a around the machine and the machine operates continuously. The die member 53 is hung on the bottom of the plunger 45 through a fixed member 54 and spring pressed rods 55. Normally this die hangs down, as shown in Fig. 5, but of course the springs have to yield when the die comes to closed position.

The motion of the rotary parts around the machine results now in allowing air to enter through the pipe 35 and ports 52 above a hollow plunger 45, and that is forced down at b. When the parts assume this position, the roll 27 reaches a depressed portion of the cam 28 at c and the mold is lowered into the hot water tank so as to soften the plastic material so that it will assume readily the shape desired in the mold. Then, as the mold passes further around, the cam 28 rises again at d and brings the whole device up out of the hot water tank to the same level as shown in Fig. 5.

Now air is admitted through the pipe 36 and a port 50 into the interior of the cylinder 42 above the piston 44 and depresses that piston. At the bottom of the piston rod 40 is fixed, in any ordinary way, a flexible rubber plunger 51. This is forced down on the plastic blank 49 and eventually comes to the final molding position at e shown in Fig. 6. Here the pressure is applied to force the plastic material into the desired shape, and the flexible core 51 fills the space therein if this kind of mold is the one to be used. Then, at f, the cam 28 lowers it into the cold water tank for setting it in its molded shape. It is then raised out of the cold water tank and brought up into the position g in which the valve 31 controls the opening of the mold while in its high position and brings it to the position a shown in Fig. 5. At this point the article molded is removed by hand and a new blank 49 placed in position. It will be understood that this operation is taking place successively with each of the molding heads and that they are all going through the same series of steps, one after the other. A continuous series of molded articles is supplied at the delivery point by this machine. It reduces labor costs very materially on account of requiring but a single operation to insert the blanks and remove the products from the machine, which is the equivalent of several machines.

The valve arrangement for controlling the operation of the dies or mold parts is of a very simple character, and the means for immersing the molds twice during the complete cycle of operations is also very simple and constitutes a strong and rigid part of the machine which supports these molds.

Although I have illustrated and described only a single form of the invention I am aware of the fact that changes can be made therein by any person skilled in the art without departing from the scope of the invention as expressed in the claims. Therefore I do not wish to be limited to the exact form shown, but what I do claim is:—

1. In a molding machine for plastic materials, the combination with a rotary standard and means for rotating said standard, of a series of arms projecting from the standard and rotatable therewith, a molding device carried by each of said arms but movable up and down independently thereof, means for closing the molding devices, a cooling water tank, and means for lowering the closed molding devices into the tank and raising them out again while they are still in closed condition and sealed against the admission of liquid from said tank.

2. In a molding machine for plastic materials, the combination with a stationary table, a rotary standard located at the center thereof and means for rotating said standard, of a series of arms projecting from the standard and rotatable therewith, a molding device carried by each of said arms but movable up and down independently thereof, each molding device comprising two parts meeting along a horizontal plane for receiving a sheet of material between them to be molded therein, a hot water tank and a cold water tank located around the table but at a lower level and means for lowering the molding devices first into the hot water tank and then into the cold water tank, and raising them out again for the purpose of first softening the material to be molded and then chilling or hardening it.

3. In a molding device for plastic materials, the combination with a stationary table, of a rotary standard at the center thereof, a series of arms radiating from said standard and movable therewith, a molding apparatus carried at the end of each arm but movable up and down, means for said molding devices, resting on said cam and thereby controlling the height of the molding device, a hot liquid tank and a cold liquid tank located around the table, said means being constructed to lower the molding device into the hot liquid tank, move it up out of it, then lower it into the cold liquid tank and move it up out of that once during each rotation of said standard, and means for operating the molding apparatus to perform the molding operation when it is moved up out of the hot liquid tank and before it is lowered into the cold liquid tank.

4. In a machine for molding plastic materials, the combination with a laterally movable molding device comprising a cylinder fixed with respect thereto, a piston in said cylinder, a plunger, a core for the mold carried by the plunger and movable with the piston, a second plunger surrounding the cylinder and movable up and down independently thereof, a die member carried by the second plunger, means controlled by the motion of the molding device for introducing fluid under pressure above the piston and above the second plunger to move them down in the proper order as the molding device moves along, for the purpose of bringing said core and die member into proper position with respect to the rest of the mold, and means for lowering the whole molding device for immersing the mold in liquid and raising it up out of the liquid again, controlled by the lateral motion of the molding device.

5. In a machine for molding plastic materials, the combination with a movable molding device comprising an end die, a cylinder fixed with respect thereto, a piston in said cylinder, a plunger, a core for the mold carried by the plunger and movable with the piston, a second plunger outside the cylinder and movable independently thereof, a die member carried by the outer plunger, means controlled by the motion of the molding device for introducing fluid under pressure beyond the piston and the outer plunger to move them in the proper order as the molding device moves along for the purpose of first introducing said core into the proper position in the die member and for the purpose of thereafter bringing said die member and core into proper position with respect to the end die of the mold.

6. In a machine for molding plastic materials, the combination of a bodily movable molding device comprising a cylinder, a base supported below the cylinder and fixed with respect thereto, a die constituting the bottom of the mold carried by said base, a piston in said cylinder, a piston rod fixed to the piston, a core for the mold fixed on the rod, a plunger outside the cylinder, a die carried by said plunger for co-operating with the base of the mold and core, means controlled by the motion of the molding device for introducing fluid under pressure above the piston to operate the core, introducing fluid under pressure above the plunger for operating the die member carried thereby, and introducing fluid under pressure below the piston to raise it, the last named means comprising a perforation through the last named piston rod and opening under the piston, and yielding means for raising the plunger when the pressure is removed therefrom above it.

7. In a molding machine, in combination a pair of tanks arranged in sequence, a mold assembly arranged above said tanks in position to travel over the same and therealong, and to rise and fall with respect thereto, said mold assembly comprising a mold proper in two parts divided horizontally, the lower part being imperforate, a plunger for forcing a sheet of material to be molded between said parts into the interstices of the mold, means for actuating the plunger, means for driving the model assembly, operating means for the plunger actuating means, and means for controlling the rise and fall of the mold assembly, said operating means and said controlling means being assembled and arranged in cooperative relation to synchronize the movements of said plunger with respect to the longitudinal travel, and the rise and fall, of the mold assembly.

8. In a molding machine, in combination a pair of tanks arranged in sequence, a frame connected with the tanks, a mold assembly arranged above said tanks on said frame for travel over the same and therealong, and for rise and fall with respect thereto, said mold assembly comprising a two-part separable mold proper comprising an upper part and a lower part, the lower part being entirely closed except at the top, means for operating the mold parts, a plunger for forcing the material to be molded into the mold, means for actuating the plunger, means for driving the mold assembly, operating means for the plunger-actuating means, and means for controlling the rise and fall of the mold assembly, said operating means, said mold-parts-operating means, and said controlling means being assembled and arranged in cooperative relation to synchronize the movements of the mold parts and of said plunger with respect to the longitudinal travel, and the rise and fall, of the mold assembly.

EARL R. PERSON.

CERTIFICATE OF CORRECTION.

Patent No. 1,969,323.　　　　　　　　　　　　　　　August 7, 1934.

EARL R. PERSON.

It is hereby certified that error appears in the printed specification of the above numbered patent requiring correction as follows: Page 3, lines 5 and 6, claim 3, strike out the words "said molding devices, resting on said cam and thereby"; and line 103, claim 7, for "model" read mold; and that the said Letters Patent should be read with these corrections therein that the same may conform to the record of the case in the Patent Office.

Signed and sealed this 2nd day of October, A. D. 1934.

Leslie Frazer (Seal)　　　　　　　　　　　　　　　　　　　　Acting Commissioner of Patents.